United States Patent [19]
Krech

[11] Patent Number: 5,684,788
[45] Date of Patent: Nov. 4, 1997

[54] METHOD OF PROVIDING A FRAME CLOCK FOR DATA SIGNALS IN A COMMUNICATIONS NETWORK AND SWITCHING DEVICE OF THE NETWORK

[75] Inventor: Erich Krech, Oppenweiler, Germany

[73] Assignee: Ant Nachrichtentechnik GmbH, Backnang, Germany

[21] Appl. No.: 556,950

[22] PCT Filed: Dec. 22, 1994

[86] PCT No.: PCT/DE94/01518

§ 371 Date: Nov. 20, 1995

§ 102(e) Date: Nov. 20, 1995

[87] PCT Pub. No.: WO95/25389

PCT Pub. Date: Sep. 21, 1995

[30] Foreign Application Priority Data

Mar. 16, 1994 [DE] Germany ............. 44 08 852.3

[51] Int. Cl.⁶ .................. H04J 3/06; H03L 7/087
[52] U.S. Cl. .............. 370/216; 370/503; 375/356; 395/200.19; 331/11
[58] Field of Search ............... 370/216, 509, 370/516, 510, 519, 508, 503; 395/200.19; 331/10, 11; 375/356, 362, 364, 371, 357

[56] References Cited

U.S. PATENT DOCUMENTS

| | | | |
|---|---|---|---|
| 4,600,896 | 7/1986 | Cellerino | 331/11 |
| 4,914,404 | 4/1990 | Ernst | 331/11 |
| 5,184,350 | 2/1993 | Dara | 370/509 |
| 5,373,537 | 12/1994 | Oberhauser | 375/357 |
| 5,475,717 | 12/1995 | Cordonnier et al. | 375/356 |

FOREIGN PATENT DOCUMENTS

| | | |
|---|---|---|
| 4134360 | 4/1993 | Germany . |
| 4207675 | 9/1993 | Germany . |
| 4224339 | 1/1994 | Germany . |

Primary Examiner—Douglas W. Olms
Assistant Examiner—Matthew C. Phillips
Attorney, Agent, or Firm—Michael J. Striker

[57] ABSTRACT

The method of providing a frame clock for data signals in a communications network includes determining phase positions (P1, P2, ...) of respective frame clock information (RT1, RT2, ...) of incoming data signals with respect to frame clock information (RTN) available at a switching point in at least one switching device (NK1, NK2, ...); storing in a memory device (SPN) in the at least one switching device (NK1, NK2, ...) values of all the determined phase positions; performing a phase control of the frame clock information (RTN) available at the switching point with respect to the frame clock information (RT1) of one incoming data signal; and when a loss of or interference with the frame clock information (RT1) with which a phase control was performed has occurred, performing a phase correction of the frame clock information (RT2) of another incoming data signal with the phase position of the frame clock information determined for the frame clock information (RT2) of the other incoming data signals prior to the loss or interference acting as a reference value. A switching device according to the invention is also provided for maintaining propogation delay stability, even in the case of loss or interference.

9 Claims, 2 Drawing Sheets

CENTRALIZED MULTI-STATION
CONTROL SIGNAL SUPPLY

METHOD OF PROVIDING A FRAME CLOCK FOR DATA SIGNALS IN A COMMUNICATIONS NETWORK AND SWITCHING DEVICE OF THE NETWORK

BACKGROUND OF THE INVENTION

The invention is based on a method of providing a frame clock for data signals in a communications network.

Transmission channels with constant propagation delays are required, in particular for feed lines of centralized multi-station control signals or synchronized broadcasting. In connection with carrier frequency systems and simple point-to-point connections, this requirement was, as a rule, met without additional effort by digital transmission systems. The user was able to set a desired total propagation delay by means of adjustable phase setting members at the end of the transmission channel. In modern digital transmission systems with branching, cross-connecting or relaying capabilities, FIFOs are used, as a rule, at the digital inputs in order to adapt all multiplex signals to a common, usually random, phase position. The propagation delays resulting from this do not have a constant value, in particular after a restart.

To obtain a constant propagation delay, it is possible to couple the phase positions of all outgoing multiplex signals to that of a selected incoming signal. In a transmission system in accordance with the pamphlet "Geräte und Anlagen der Nachrichtentechnik 2 Industrielle Netze der ANT Nachrichtentechnik, Seiten 6 und 7 insbesondere Flex Plex XMP1" [Apparatus and Installations of Communications Technology 2, Industrial Networks of ANT Communications Technology, pages 6 and 7, in particular Flex Plex XMP1], the frame identification word is employed as reference.

This solution is sufficient for line- or star-shaped networks. However with meshed network structures it is unsatisfactory, because net interferences result in changes in propagation delay.

Meshed transmission networks with Flex Plex XMP1 offer an integrated cycle synchronization of the entire network which reacts flexibly to network interferences and maintains the desirable synchronization in the entire network (or within partial networks if the entire network disintegrates because of interference). However, the solution for constant propagation delay transmission known so far is not compatible with this because of the required locked fixing of the reference signal.

With phase-locked transmission a clock reference tree is manually preset. All desired nodes form a rigid partial network offering stable propagation times between arbitrary points. The concept is not compatible with replacement circuits.

Partial networks which are separated from the preset clock reference tree by interference have no defined cycle reference with the remaining network, even if cycle synchronization were possible via 2 MBit/s connections not contained in the clock reference tree. In particular, centralized multi-station control channels run through such connections are no longer stable in their propagation delay.

A bus system for a local operating system is known from DE 42 24 339 A1. The communication transmitted by a subscriber is sent to all subscribers via a star coupler. A frame clock signal is generated by a frame clock signal generator and sent to the star coupler, wherein the chronological sequence of the frame data of the frame clock in the star coupler define a reference frame clock. The further subscribers define an individual frame transmission cycle, taking into consideration the propagation delay to the star coupler.

In German Patent DE 41 34 360 C1, different propagation delays in partial networks are compensated by appropriate propagation delay compensating units. In German Patent DE 42 07 675 C1, bus stations are equipped with frame generators and control devices, which take over the central cycle supply in case of loss or interference. This solution is also phase-locked.

SUMMARY OF THE INVENTION

It is the object of the instant invention to provide a method for providing a frame clock for data signals in which propagation delay stability continues to be maintained, in particular in case of loss or interference.

It is another object of the present invention to provide a switching device in a communication network by means of which propagation time stability can be maintained, even in the case of loss or interference.

This object is attained according to the invention by a method of providing a frame clock for data signals in a communications network including the steps of:

a) determining phase positions (P1, P2, ...) of respective frame clock information (RT1, RT2, ...) of incoming data signals with respect to frame clock information (RTN) available at a switching point in at least one switching device (NK1, NK2, ...) of the communications network;

b) protectively storing in a memory device (SPN) in the at least one switching device (NK1, NK2, ...) values of all phase positions (P1, P2, P3) of the frame clock information (RT1, RT2, ...) determined in step a);

c) performing a phase control of the frame clock information (RTN) available at the switching point with respect to the frame clock information (RT1) of one incoming data signal;

d) determining if a loss of or interference of the frame clock information (RT1) with which the phase control of step b) was performed has occurred; and e) when the loss of or interference of frame clock information (RT1) has occurred, performing a phase correction with the phase position of the frame clock information (RT2) of a further incoming data signal determined prior to the loss or interference as a reference value.

In preferred embodiments of the method according to the invention the phase control includes averaging over several frame clock phases. Advantageously also a bit clock signal is derived from the phase-controlled frame clock signal.

The method describe hereinabove is particularly advantageous for data signals in a meshed communications network comprising a plurality of network nodes for centralized multi-station control signals or synchronized broadcasting.

A switching device for a communications network by means of which propagation delay stability can be maintained, even in case of loss or interference, is also part of the present invention. The switching device, advantageously consisting of a network node (NK1) of the communications network, comprises a frame clock signal generator, one or several phase measuring devices for respective determination of phase positions of frame clock information of incoming data signals with respect to the frame clock information from the frame clock signal generator, a phase control device for the adjustment of an output signal of the frame clock signal generator to the frame clock information of one incoming data signal, a memory device for values of the respective phase positions of the frame clock information of the incoming data signals, said values being determined by the one or several phase measuring devices and a control device for switching the reference signal for the phase control device to a different incoming data signal when a loss of or interference of frame clock information of the one incoming data signal has occurred.

In a preferred embodiment of the switching device only a single phase measuring device is present but a selection switch is included for connecting the single phase measuring device to respective connection ports at which the frame clock information is input. The control device also includes means for switching the switch for selection of the reference signal for the phase control device.

The present invention also includes a meshed communications network comprising a plurality of network nodes for centralized multi-station control signals or synchronized broadcasting, in which at least one of the network nodes consists of the switching device according to the invention described hereinabove.

In the method or arrangement in accordance with the invention it is possible to determine, in particular measure, the phase relationships with respect to a switching point—with branched and/or meshed networks with respect to a network node—of all input points providing frame clock information. The phase of the frame clock signal intrinsic to the switching point (system cycle) can be adjusted to the frame clock information of any arbitrary input point.

If the phase positions of the frame clock information of all incoming data signals are stored, it is possible to fall back on these values in case of any arbitrary loss (even with replacement circuits), so that the phase relations within all partial networks can continue to be kept constant.

Furthermore, the phase control in accordance with the invention can take place along the propagation direction of the bit clock signal. However, all resulting clock reference trees are permissible, not only a predetermined one.

In case of interferences in the network which lead to signal changes, only the phase value of the input point (port) for frame clock information from which the signal is now derived is used for phase control. The control only needs to make a readjustment to the previously stored value, all phase relations in the network are preserved by means of this.

Since, without consideration of interference, it is no longer necessary to guide the clock reference tree in the same way in which the data signal, for example the centralized multi-station control signal, is propagated, it is possible to operate several crossing centralized multi-station signals in the network without problems.

BRIEF DESCRIPTION OF THE DRAWINGS

Exemplary embodiments of the invention will be explained with the aid of the following drawing figures.

DESCRIPTION OF THE PREFERRED EMBODIMENTS

Figure 1:
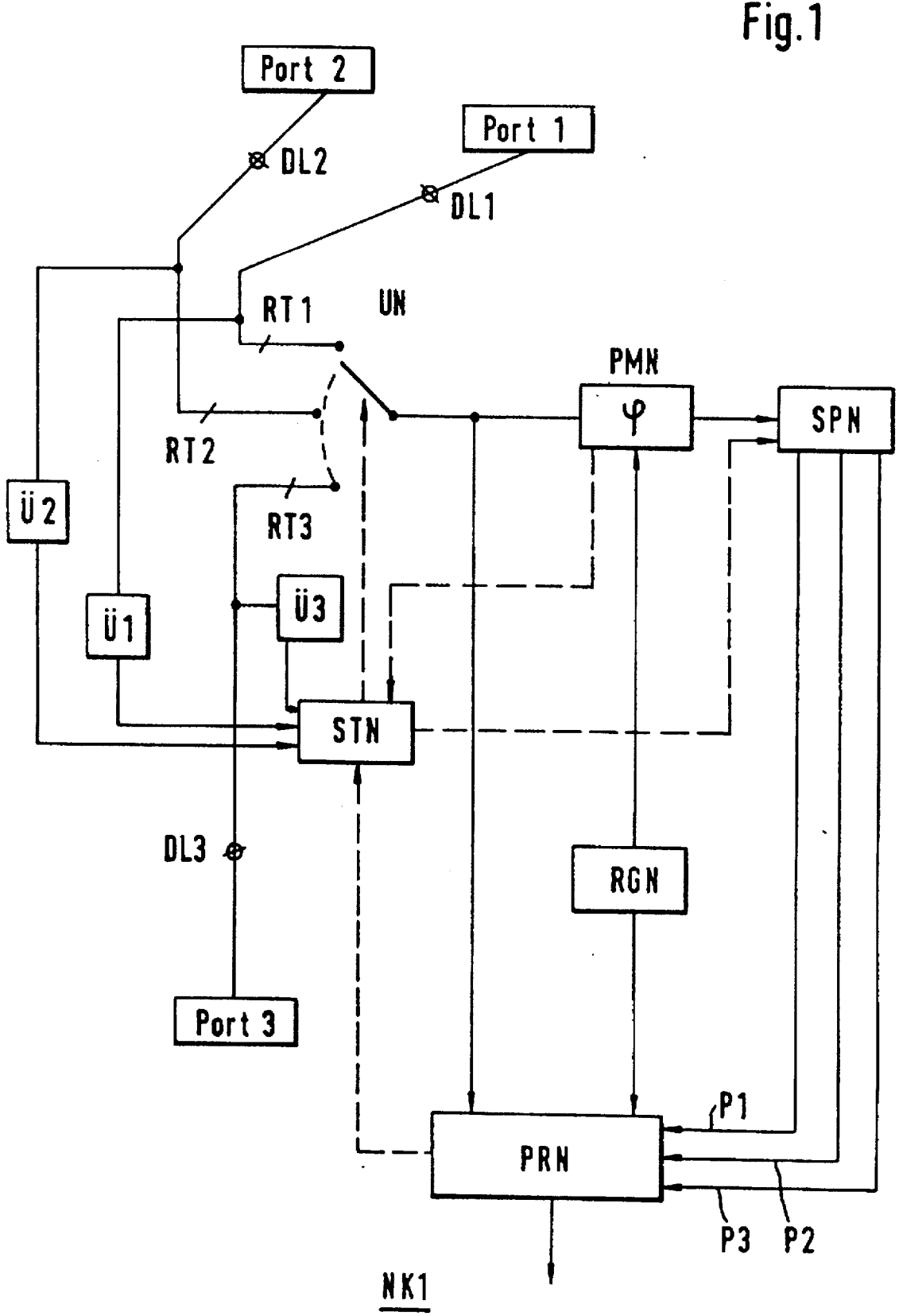
FIG. 1 is a diagram of a communications network with a network node according to the invention.

FIG. 1 shows a simple communications network with a switching point (network node) NK1. For explanation of the principle, it is embodied in the form of a star network with several data input points Port1, Port2, Port3. Multiplex signals reach the network node NK1 via the data lines DL1, DL2, DL3 and contain, besides use data—voice, centralized multi-station control signals, synchronized broadcasting, images, sound signals—, also frame clock information RT1, RT2, RT3. On account of different line lengths and running times, the multiplex signals reach the network node NK1 with different phase positions P1, P2, P3. These different phase positions P1, P2, P3 of the frame clock information RT1, RT2, RT3 of incoming data signals are measured in a phase measuring device PMN in the network node NK1. The frame clock information RTN, which is intrinsic to the switching point/network node and is provided by a frame clock generator RGN, is used as the phase reference value for the phase measurement. To measure the phase positions P1, P2, P3 of all incoming frame clock information RT1, RT2, RT3, either just as many phase measuring devices are provided as there are incoming data lines or, as shown in FIG. 1, only one phase measuring device PMN is provided which can be connected via a selection switch UN with respectively one of the data input points—PORT1, PORT2, PORT3—. A control device STN is provided for controlling the selection switch UN, which can be activated, for example via a phase control device PRN, for further switching. All measured phase values are protectively stored in a memory SPN. Storage of the phase values is advantageously triggered by the user. As a rule, it is necessary for the network to be in an interference-free operating state for this.

During calibration, the phase position of all ports in respect to the frame clock information intrinsic to the network node is measured, for example on the basis of a manually entered clock reference tree from a preferred clock reference tree, or simply from the actual state (possibly with lines previously already calibrated).

In place of the previous phase control with a fixed delay in respect to a fixed reference port, the system cycle intrinsic to the network node and supplied by the frame clock generator RGN can be adjusted to any arbitrary frame clock information RT1, RT2, RT3 by means of the phase control device PRN; i.e. it is possible to set any arbitrary delay to any arbitrary port.

During interference in the network which in particular leads to cycle reversals, the phase control is performed on the frame clock information of a further incoming data signal, for example RT2, with the phase position of the frame clock information which had been determined for this incoming data signal prior to the interference as a reference value. The control device STN which, in this case, makes the connection to another port—Port 2—via the selection switch UN, also causes the appropriate phase value to be forwarded from the memory SPN to the phase control device PRN. To detect such an interference state, a monitoring device Ü1, Ü2, Ü3, which is provided anyway in a communications network for other purposes, for example alarm signals, is associated with each data line DL1, DL2, DL3. If there is a frame clock information loss or a high proportion of bit errors, the entire signal on this data line, for example DL1, is considered to be disturbed and an appropriate report is sent to the control device STN, which triggers switching of the selection switch UN and the read-out of the former phase value P2 required for phase control. The phase control merely needs to make a readjustment to the former phase value P2. All phase relations within the network are therefore preserved.

The phase control can suitably take place further along the propagation direction of the bit clock signal, but all resulting clock reference trees are permissible (for example reversal of the propagation direction in a meshed network), not only a preset one. Since it is no longer necessary to guide the clock reference tree in consideration of interference in the same way the centralized multi-station control signal is propagated, it is possible to operate several crossing centralized multi-station signals in the network without problems.

Figure 2:
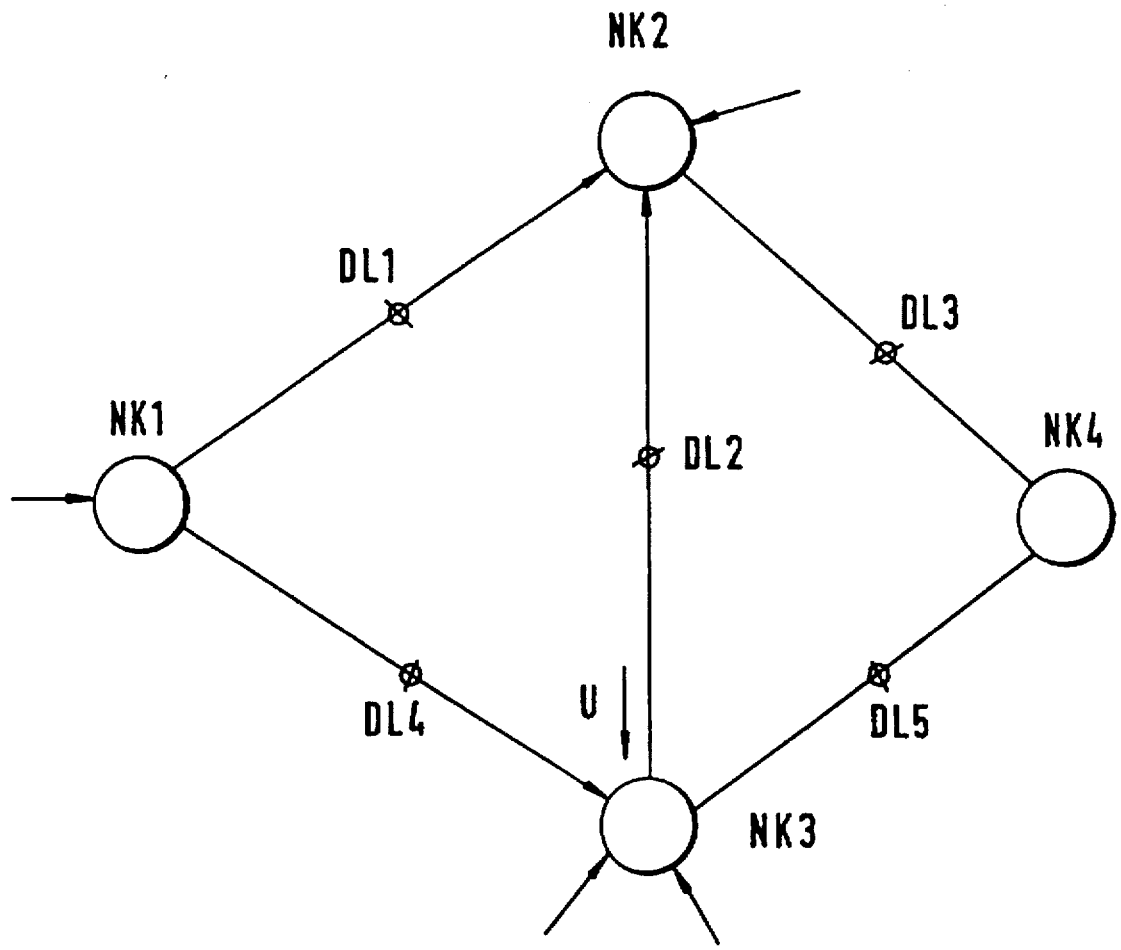
FIG. 2 is a diagram of a meshed communications network with several network nodes.

As with interferences, in case of any arbitrary loss of a frame clock information (even with replacement circuits) it is possible to fall back on stored phase values, so that the phase relations within all partial networks can continue to be kept constant. FIG. 2 shows the principle of a simple meshed network. If the frame clock information on the data line DL1 is lost, it is possible to fall back to the frame clock information of the data line DL2 which in turn receives its frame clock information via the data line DL4. In this case a reversal of the propagation direction of the frame clock information (see arrow U) takes place on the data line DL2. If necessary, its own phase setting device must be provided for this replacement path because of the different propagation delays. With line replacement circuits it is necessary to take care that the propagation delay difference between the two paths is still within the detection range of the phase measuring device. If this detection range is limited, for example to modulo 250 μs, the propagation delay difference must not be greater than ± 125 μs. Furthermore, with replacement circuits the propagation delay difference which can be compensated for is limited by the storage depth of the FIFOs which match the incoming multiplex signals to a common phase position. In this case care must be taken that the FIFOs are set to defined propagation delays.

It is advantageous for phase control to form a mean phase value over several frame clock signal phases, so that no errors caused by jitters occur.

It is also advantageous to derive the bit clock signal for further processing of the data from the phase-controlled frame clock signal.

I claim:

1. A method of providing a frame clock for data signals in a communications network, said method comprising the steps of:
   a) determining phase positions (P1, P2, ...) of respective frame clock information (RT1, RT2, ...) of incoming data signals with respect to frame clock information (RTN) available at a switching point in at least one switching device (NK1, NK2, ...) of the communications network;
   b) protectively storing in a memory device (SPN) in said at least one switching device (NK1, NK2, ...) values of all of said phase positions (P1, P2, P3, ...) of the frame clock information (RT1, RT2, ...) determined in step a);
   c) performing a phase control of said frame clock information (RTN) available at said switching point with respect to said frame clock information (RT1) of one of said incoming data signals;
   d) determining if a loss of or interference of said frame clock information (RT1) with which the phase control of step c) was performed has occurred by a monitoring means (Ü1, Ü2, Ü3); and
   e) when said loss of or said interference of said frame clock information (RT1) has occurred, performing a phase correction with a reference value consisting of the phase position of said frame clock information (RT2) of a further one of said incoming data signals determined in step a); said phase position of said frame clock information (RT2) of said further one of said incoming signals being determined prior to occurrence of said loss or said interference.

2. The method as defined in claim 1, wherein said performing said phase control comprises averaging over several frame clock phases.

3. The method as defined in claim 1, further comprising deriving a bit clock signal from a phase-controlled frame clock signal.

4. A switching device for a communications network, said switching device comprising:
   a frame clock signal generator (RGN),
   one or several phase measuring devices (PMN) for respective determination of respective phase positions (P1, P2, ...) of frame clock information (RT1, RT2, ...) of incoming data signals with respect to frame clock information (RTN) from said frame clock signal generator (RGN),
   a phase control device (PRN) for the adjustment of an output signal of the frame clock signal generator (RGN) with the frame clock information (RT1, RT2, ...) of a selected one of the incoming data signals acting as a reference signal,
   a memory device (SPN) for values of the respective phase positions (P1, P2, ...) of the frame clock information (RT1, RT2, ...) of said incoming data signals, said values being determined by said one or several phase measuring devices (PMN), and
   a control device (STN) for switching said reference signal for adjustment of the output signal of the frame clock signal generator to a different one of said incoming data signals when a loss of or interference of said frame clock information of said one of said incoming data signals has occurred.

5. The switching device as defined in claim 4, further comprising means (Ü1, Ü2, Ü3) for monitoring to determine when a loss of or interference of said frame clock information of each of said incoming data signals has occurred.

6. The switching device as defined in claim 5, having only one of said phase measuring devices (PMN) and further comprising a selection switch (UN) for connecting said phase measuring device (PMN) to respective connection points (PORT1, PORT2, ...) at which said frame clock information (RT1, RT2, ...) of said incoming data signals is input, said control device (STN) also including means for switching said switch (UN) for selection of said reference signal for said phase control device.

7. The switching device as defined in claim 4 and consisting of a network node (NK1) of the communications network.

8. A meshed communications network comprising a plurality of network nodes for centralized multi-station control signals or synchronized broadcasting, wherein at least one of said network nodes comprises:
   a frame clock signal generator (RGN),
   one or several phase measuring devices (PMN) for respective determination of phase positions (P1, P2, ...) of frame clock information (RT1, RT2, ...) of incoming data signals with respect to the frame clock information (RTN) from the frame clock signal generator (RGN),
   a phase control device (PRN) for the adjustment of an output signal of the frame clock signal generator (RGN) to the frame clock information (RT1, RT2, ...) of one of said incoming data signals, a memory device (SPN) for values of the respective phase positions (P1, P2, . . . ) of the frame clock information (RT1, RT2, . . . ) of said incoming data signals, said values being determined by the one or several phase measuring devices, and a control device for switching said reference signal for adjustment of the output signal of the frame clock signal generator to a different one of said incoming data signals when a loss of or interference of said frame clock information of said one of said incoming data signals has occurred.

9. A method of providing a frame clock for data signals in a meshed communications network comprising a plurality of network nodes for centralized multi-station control signals or synchronized broadcasting, said method comprising the steps of:

a) determining phase positions (P1, P2, . . . ) of respective frame clock information (RT1, RT2, . . . ) of incoming data signals with respect to frame clock information (RTN) available at a switching point in at least one switching device (NK1, NK2, . . . ) of the communications network;

b) protectively storing in a memory device (SPN) in said at least one switching device (NK1, NK2, . . . ) values of all of said phase positions (P1, P2, P3) of the frame clock information (RT1, RT2, . . . ) determined in step a);

c) performing a phase control of said frame clock information (RTN) available at said switching point with respect to said frame clock information (RT1) of one of said incoming data signals;

d) determining if a loss of or interference of said frame clock information (RT1) with which the phase control of step c) was performed has occurred by a monitoring means (Ü1, Ü2, Ü3 );

e) when said loss of or interference of said frame clock information (RT1) has occurred, performing a phase correction of the frame clock information (RT2) of a further one of said incoming data signals with the phase position of said frame clock information (RT2) of said further one of said incoming data signals determined prior to said loss or interference as a reference value.

* * * * *